United States Patent
Kasazumi et al.

(10) Patent No.: US 10,451,872 B2
(45) Date of Patent: Oct. 22, 2019

(54) DISPLAY DEVICE

(71) Applicant: Panasonic Intellectual Property Management Co., Ltd., Osaka (JP)

(72) Inventors: Ken'ichi Kasazumi, Osaka (JP); Toshiya Mori, Osaka (JP); Hiroaki Okayama, Nara (JP); Satoshi Kuzuhara, Osaka (JP); Hiroyuki Furuya, Osaka (JP); Hiroshi Gotou, Osaka (JP); Akira Kurozuka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 125 days.

(21) Appl. No.: 15/849,799

(22) Filed: Dec. 21, 2017

(65) Prior Publication Data
US 2018/0113307 A1    Apr. 26, 2018

Related U.S. Application Data

(63) Continuation of application No. PCT/JP2016/002830, filed on Jun. 13, 2016.

(30) Foreign Application Priority Data

Jul. 1, 2015  (JP) ................. 2015-133138

(51) Int. Cl.
  *G02B 27/01*  (2006.01)
  *G02B 26/10*  (2006.01)
  (Continued)

(52) U.S. Cl.
  CPC .......... *G02B 27/0101* (2013.01); *B60K 35/00* (2013.01); *G02B 26/10* (2013.01);
  (Continued)

(58) Field of Classification Search
  CPC .................. G02B 27/0103; G02B 27/0101
  See application file for complete search history.

(56) References Cited

U.S. PATENT DOCUMENTS

| | | | |
|---|---|---|---|
| 2005/0200962 A1 | 9/2005 | Voloschenko et al. | |
| 2009/0141363 A1* | 6/2009 | Shin .................. | G02B 27/0101 359/630 |
| 2009/0160736 A1* | 6/2009 | Shikita .............. | G02B 27/0101 345/7 |

FOREIGN PATENT DOCUMENTS

| | | |
|---|---|---|
| DE | 102012201311 A1 | 8/2013 |
| FR | 2986873 A1 | 8/2013 |

(Continued)

OTHER PUBLICATIONS

International Search Report of PCT application No. PCT/JP2016/002830 dated Aug. 16, 2016.

(Continued)

*Primary Examiner* — Sepehr Azari
(74) *Attorney, Agent, or Firm* — Greenblum & Bernstein, P.L.C.

(57) ABSTRACT

The present invention provides a display device that can easily perform control for driving a movable screen. Display device includes light source that emits a light beam, scanner that causes the light beam from light source to scan, movable screen in which a first image is formed by transmitting the light beam from scanner, projection unit that projects the first image formed in movable screen on windshield and displays a virtual image of the first image in a space in front of windshield, and driver that causes movable screen to reciprocate in a first direction separating from scanner and in a second direction approaching scanner. Movable screen reciprocates in a posture inclined to moving directions of movable screen.

5 Claims, 11 Drawing Sheets

(51) Int. Cl.
*H04N 13/393* (2018.01)
*B60K 35/00* (2006.01)
*H04N 9/31* (2006.01)
*H04N 13/363* (2018.01)

(52) U.S. Cl.
CPC ......... *H04N 9/3129* (2013.01); *H04N 13/363* (2018.05); *H04N 13/393* (2018.05); *B60K 2370/155* (2019.05); *B60K 2370/1529* (2019.05); *B60K 2370/334* (2019.05); *B60K 2370/67* (2019.05); *G02B 2027/014* (2013.01); *G02B 2027/0127* (2013.01); *G02B 2027/0141* (2013.01); *G02B 2027/0154* (2013.01); *G02B 2027/0159* (2013.01)

(56) References Cited

FOREIGN PATENT DOCUMENTS

| | | |
|---|---|---|
| JP | 6-115381 A | 4/1994 |
| JP | 2009-150947 | 7/2009 |
| JP | 2015-034945 A | 2/2015 |

OTHER PUBLICATIONS

The Extended European Search Report dated Mar. 28, 2018 for the related European Patent Application No. 16817423.3.

\* cited by examiner

DISPLAY DEVICE

TECHNICAL FIELD

The present disclosure relates to a display device for displaying an image.

BACKGROUND ART

For example, a vehicular head-up display (HUD) has been known as a display device for displaying an image (refer to PTL 1, for example). The head-up display employs so-called augmented reality (AR), and displays a virtual image of an image formed on a movable screen, in a space in front of a windshield of a vehicle. With this configuration, a driver can view information about driving (for example, car navigation information) superimposed on a scene in front of the windshield.

CITATION LIST

Patent Literature

PTL 1: Unexamined Japanese Patent Publication No. 2009-150947

SUMMARY

However, a display device in PTL 1 has a problem in which complicate control is needed for driving the movable screen.

Hence the present invention provides a display device that can easily perform control for driving a movable screen.

A display device according to an aspect of the present disclosure includes a light source configured to emit a light beam, a scanner configured to cause the light beam from the light source to scan, a movable screen in which an image is formed by transmitting the light beam from the scanner, an optical system configured to project the image formed in the movable screen on a display medium, and a driver configured to cause the movable screen to reciprocate in a first direction separating from the scanner and in a second direction approaching the scanner. The image projected on the display medium is displayed as a virtual image of the image in a space in front of the display medium, and the movable screen reciprocates in a posture inclined to moving directions of the movable screen.

It should be noted that those comprehensive or specific aspects may be implemented by a system, a method, an integrated circuit, a computer program, or a computer-readable recording medium such as a CD-ROM, or may be implemented by any combination of the system, the method, the integrated circuit, the computer program, and the recording medium.

The display device of the present disclosure can easily perform the control for driving the movable screen.

Figure 1:
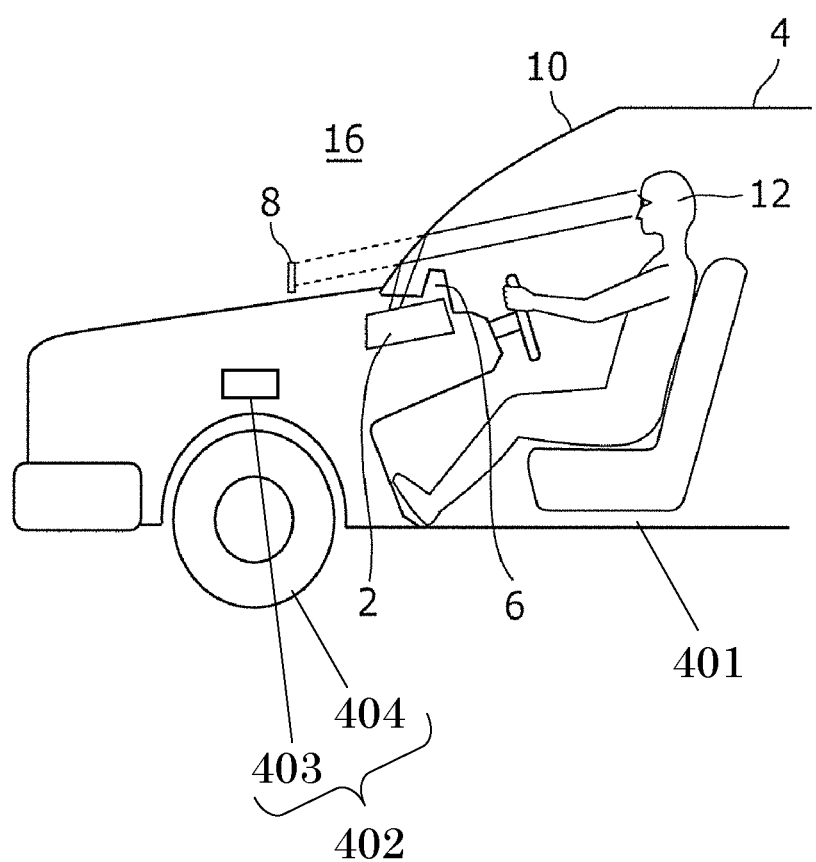
FIG. 1 is a view illustrating a usage example of a display device according to a first exemplary embodiment.

DESCRIPTION OF EMBODIMENTS (Knowledge Underlying the Present Invention)

The inventors of the present application have found that the following problem arises in the technology described in the section of "BACKGROUND ART".

In the display device in PTL 1, a laser light beam raster-scans a movable screen that reciprocates in predetermined directions, thereby forming an image on the movable screen. A virtual image of the image formed on the movable screen is displayed in a space in front of a windshield of a vehicle. At this time, the movable screen reciprocates in a posture perpendicular to the moving directions of the movable screen (hereinafter, referred to as a "vertical posture").

In the space in front of the windshield, the virtual image of the image formed on the movable screen may be displayed in a vertical direction (a gravity acting direction), in some cases. A display direction of the virtual image in the space in front of the windshield changes according to a forming direction of the image (that is, a drawing direction of the image) on the movable screen. For example, when the forming direction of the image on the movable screen is perpendicular to the moving directions of the movable screen, the display direction of the virtual image in the space is made to be the vertical direction. At timing when the virtual image is to be displayed, the reciprocating movable screen is urgently stopped temporarily, and the image is formed on the movable screen while the movable screen is stopped in the vertical posture. This allows the forming direction of the image to be perpendicular to the moving directions of the movable screen.

However, the control to urgently stop the reciprocating movable screen temporarily in this manner brings about complexity, which causes a problem.

To solve such a problem, a display device according to an aspect of the present disclosure includes a light source configured to emit a light beam, a scanner configured to cause the light beam from the light source to scan, and a movable screen in which an image is formed by transmitting the light beam from the scanner. The display device further includes an optical system configured to project the image formed in the movable screen on a display medium, and a driver configured to cause the movable screen to reciprocate in a first direction separating from the scanner and in a second direction approaching the scanner. The image projected on the display medium is displayed as a virtual image of the image in a space in front of the display medium. Furthermore, the movable screen reciprocates in a posture inclined to moving directions of the movable screen.

According to the present aspect, the movable screen reciprocates in the posture inclined to the moving directions of the movable screen. Accordingly, in order to display the virtual image of the image in a vertical direction in the space, the image is formed in the movable screen when the movable screen is kept to move in the first direction or in the second direction. This allows a forming direction of the image to be perpendicular to the moving directions of the movable screen. As a result, at timing when the image is formed in the movable screen, the movable screen is not needed to be urgently stopped temporarily, and therefore control for driving the movable screen can easily be performed.

Furthermore, the movable screen reciprocates in the posture inclined to the moving directions of the movable screen. Therefore a change amount of the position of the light beam that scans the movable screen becomes lager than a moving distance of the movable screen in the first direction or in the second direction. As a result, a stroke amount of the reciprocating movable screen can be minimized, and therefore the control for driving the movable screen can easily be performed.

For example, the scanner may form a first image in the movable screen while the movable screen moves in one of the first direction and the second direction. The optical system may display a vertical image that is a virtual image of the first image formed in the movable screen, in a vertical direction in the space.

According to the present aspect, the first image is formed in the movable screen when the movable screen moves in one of the first direction and the second direction. With this configuration, the vertical image that is the virtual image of the first image formed in the movable screen can be displayed in the vertical direction in the space.

For example, the scanner may further form a second image in the movable screen while the movable screen moves in the other of the first direction and the second direction. The optical system may further display a depth image that is a virtual image of the second image formed in the movable screen, in a depth direction that is a direction intersecting the vertical direction in the space.

According to the present aspect, the second image is formed in the movable screen when the movable screen moves in the other of the first direction and the second direction. With this configuration, the depth image that is the virtual image of the second image formed in the movable screen can be displayed in the depth direction in the space.

For example, a moving speed of the movable screen when the first image is formed in the movable screen may be smaller than a moving speed of the movable screen when the second image is formed in the movable screen.

According to the present aspect, by moving the movable screen at those moving speeds, the vertical image can be displayed in the vertical direction and the depth image can be displayed in the depth direction.

For example, the display medium may be a vehicular windshield, and the space may be a space in front of the vehicular windshield.

According to the present aspect, the display device can be used as a vehicular head-up display.

It should be noted that those comprehensive or specific aspects may be implemented by a system, a method, an integrated circuit, a computer program, or a computer-readable recording medium such as a CD-ROM, or may be implemented by any combination of the system, the method, the integrated circuit, the computer program, and the recording medium.

Hereinafter, exemplary embodiments will specifically be described with reference to the drawings.

Note that the exemplary embodiments that will be described below provide comprehensive, specific examples of the present disclosure. Numerical values, shapes, materials, structural elements, arrangement positions and connection modes of the structural elements, steps, order of the steps, and the like illustrated in the following exemplary embodiments are examples, and therefore are not intended to limit the present invention. Furthermore, among structural elements in the following exemplary embodiments, structural elements not recited in the independent claim indicating the broadest concept are described as optional structural elements.

(First Exemplary Embodiment)
[1-1. Schematic Configuration of Display Device]

Figure 2:
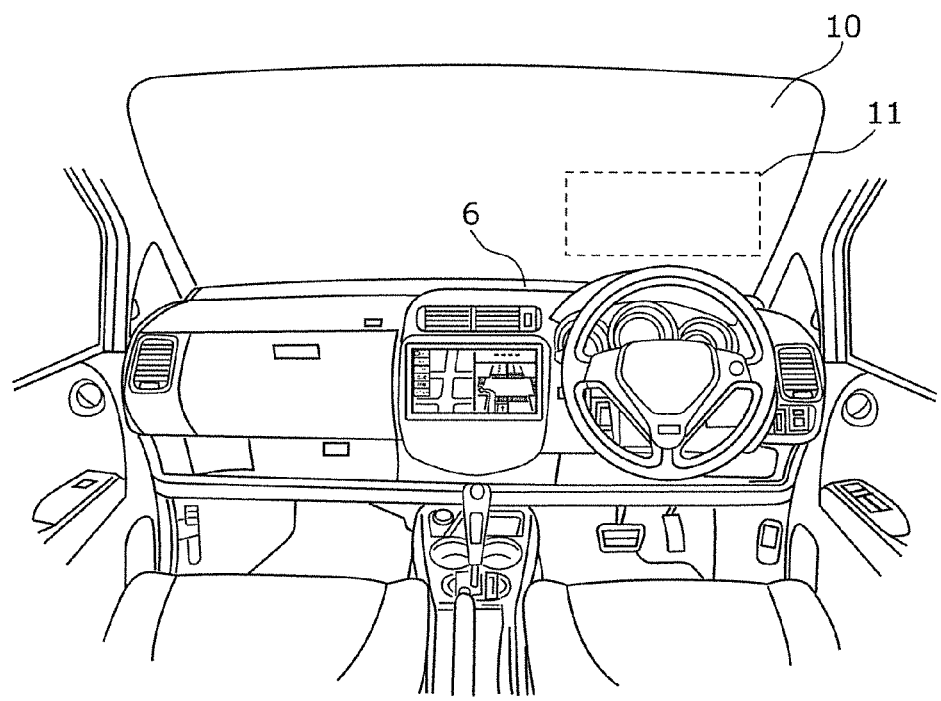
FIG. 2 is a view illustrating a region of an image displayed by the display device according to the first exemplary embodiment.
Figure 3:
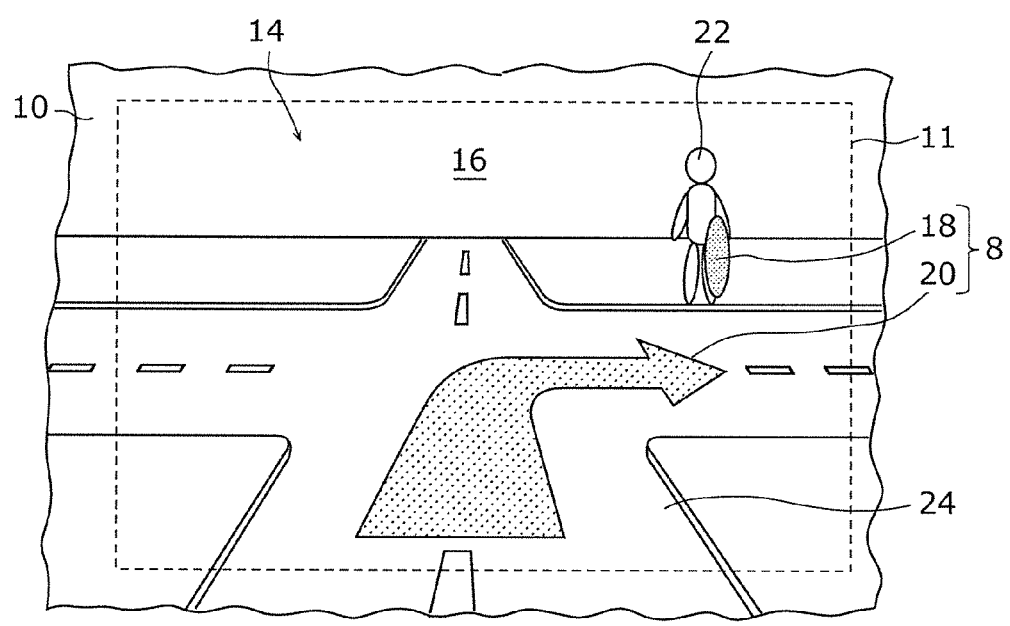
FIG. 3 is a view illustrating an example of the image displayed by the display device according to the first exemplary embodiment.

First, a schematic configuration of display device 2 according to a first exemplary embodiment will now be described herein with reference to FIGS. 1 and 3. FIG. 1 is a view illustrating a usage example of display device 2 according to the first exemplary embodiment. FIG. 2 is a view illustrating region 11 of image 8 displayed by display device 2 according to the first exemplary embodiment. FIG. 3 is a view illustrating an example of image 8 displayed by display device 2 according to the first exemplary embodiment.

As illustrated in FIG. 1, display device 2 according to the first exemplary embodiment is, for example, a vehicular head-up display, and is disposed in dashboard 6 of automobile 4 (an example of a vehicle). Furthermore, automobile 4 includes body part 401 and driver 402 configured to drive body part 401. Driver 402 includes drive source 403 such as an engine and a motor, and drive wheels 404 driven by drive source 403.

As illustrated in FIGS. 1 and 2, display device 2 projects a laser light beam (an example of a light beam) for displaying image 8 that is a virtual image toward region 11 that locates at a lower part in windshield 10 and is close to a driver sheet in automobile 4, for example. With this configuration, the laser light beam is reflected at windshield 10 toward driver 12. Therefore, as illustrated in FIG. 3, driver 12 can view image 8 that is the virtual image superimposed on scene 14 in front of windshield 10. In other words, display device 2 displays (projects) image 8 that is the virtual image in space 16 in front of windshield 10.

In an example illustrated in FIG. 3, image 8 displayed by display device 2 includes vertical image 18 and depth image 20. Vertical image 18 is a virtual image displayed in a vertical direction (up-and-down direction in FIG. 1) in space 16 in front of windshield 10. Vertical image 18 is, for example, a mark having a substantially elliptical shape that is vertically long, and is displayed so as to be superimposed on pedestrian 22 present in front of automobile 4. This configuration allows driver 12 to easily perceive presence of pedestrian 22.

Meanwhile, depth image 20 is a virtual image displayed in a depth direction (right-and-left direction in FIG. 1) that is a direction intersecting the vertical direction in space 16 in front of windshield 10. Depth image 20 is, for example, an arrow for guiding a traveling route to a destination (an arrow for instructing to turn right at the intersection, in an example in FIG. 3), and is displayed so as to be superimposed on road 24 present in front of automobile 4. This configuration allows driver 12 to easily perceive the traveling route to the destination.

[1-2. Specific Configuration of Display Device]

Figure 4:
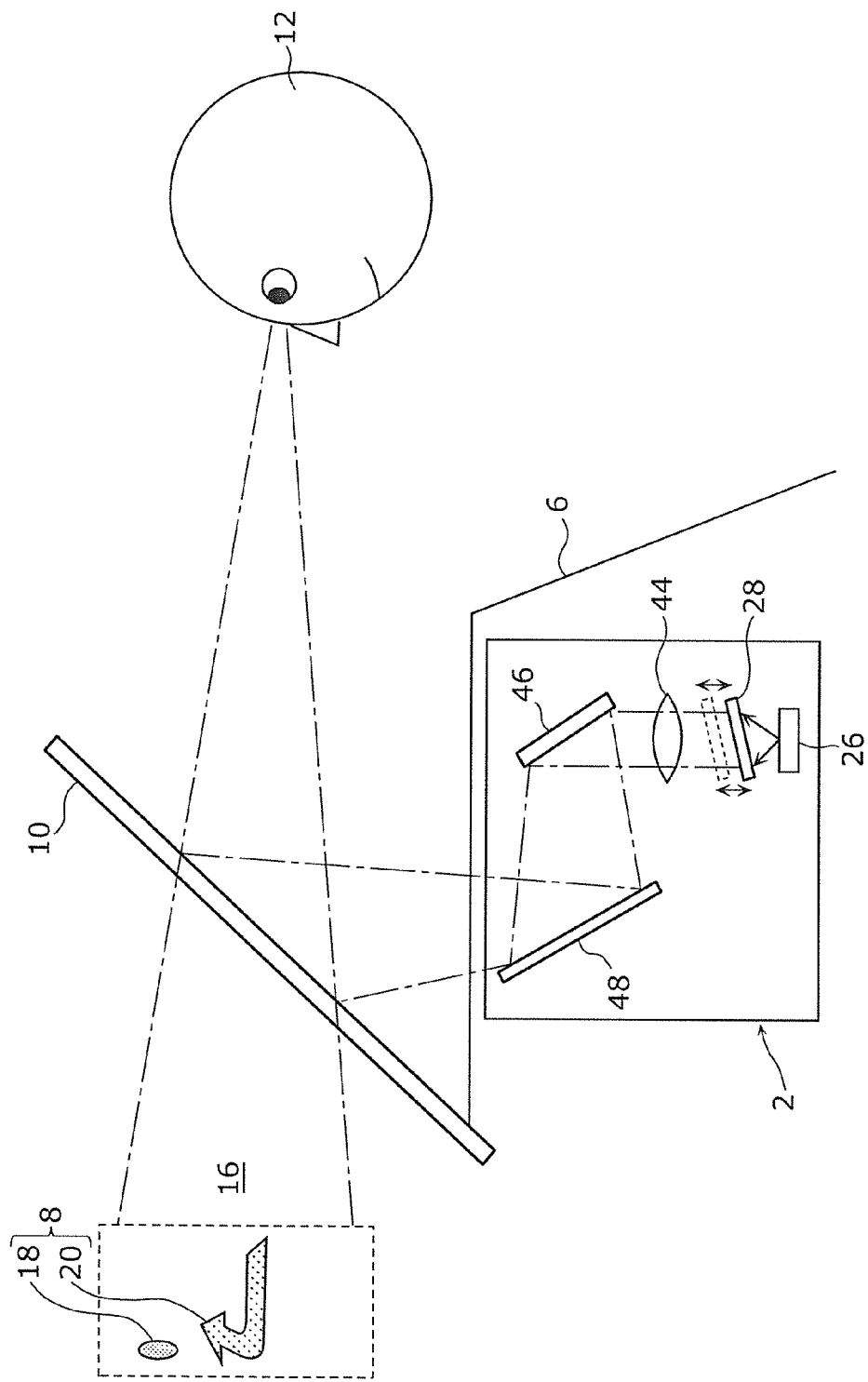
FIG. 4 is a view illustrating a configuration of the display device according to the first exemplary embodiment.
Figure 5:
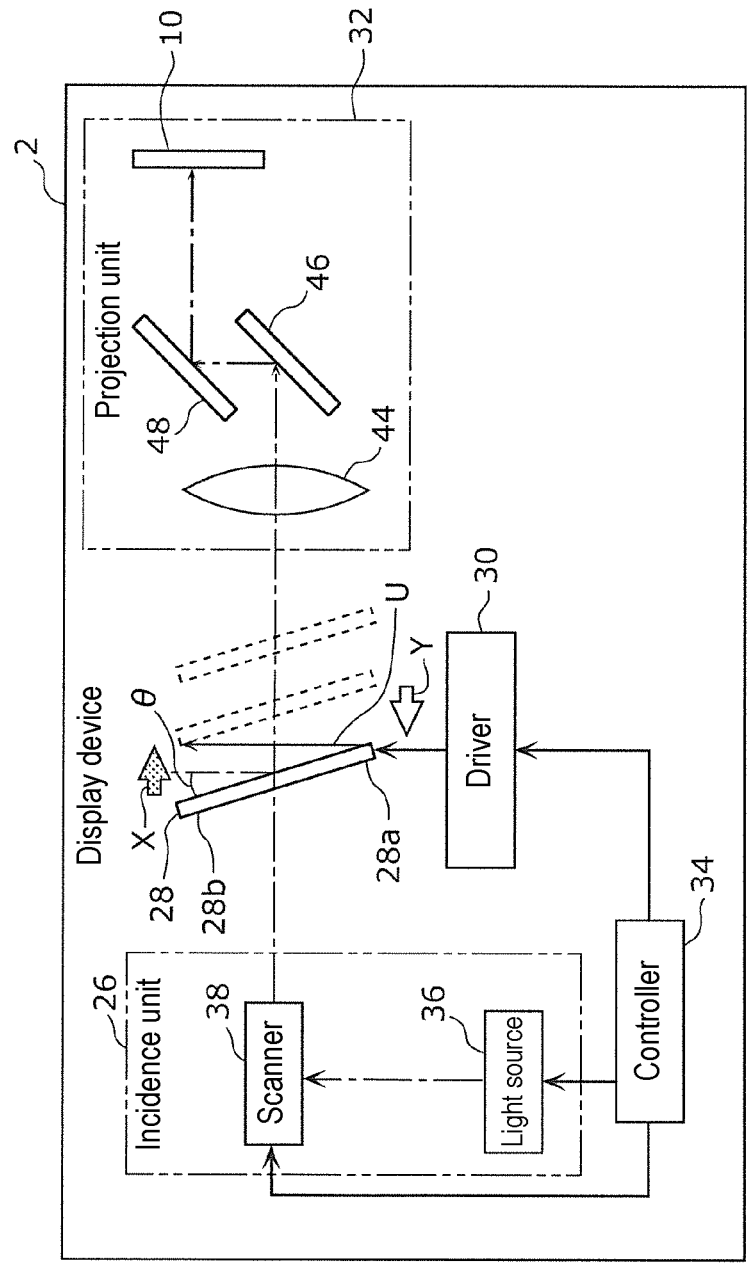
FIG. 5 is a block diagram illustrating a functional configuration of the display device according to the first exemplary embodiment.

Next, specific configurations of display device 2 according to the first exemplary embodiment will now be described herein with reference to FIGS. 4 and 5. FIG. 4 is a view illustrating a configuration of display device 2 according to the first exemplary embodiment. FIG. 5 is a block diagram illustrating a functional configuration of display device 2 according to the first exemplary embodiment.

As illustrated in FIGS. 4 and 5, display device 2 includes incidence unit 26, movable screen 28, driver 30, projection unit 32 (an example of an optical unit), and controller 34.

Incidence unit 26 includes light source 36 and scanner 38. Light source 36 includes a red laser diode that emits a laser light beam having a red component (R), a green laser diode that emits a laser light beam having a green component (G), and a blue laser diode that emits a laser light beam having a blue component (B). The laser light beam having the red component, the laser light beam having the green component, and the laser light beam having the blue component that are emitted from light source 36 are synthesized by, for example, a dichroic mirror (not illustrated) and then enter scanner 38.

Scanner 38 is configured with a micro-electro-mechanical system (MEMS) mirror, for example. Scanner 38 reflects the entered laser light beam toward a direction according to a deflection angle thereof, and therefore causes the laser light beam from light source 36 to raster-scan movable screen 28 in a two-dimensional manner. Scanner 38 causes the laser light beam to raster-scan from first end 28a (a lower end in FIG. 5) toward second end 28b (an upper end in FIG. 5) of movable screen 28, for example. Note that first end 28a is an end farther from scanner 38, and second end 28b is an end closer to scanner 38.

Movable screen 28 is a rectangular screen having translucency (for example, semitransparency). As illustrated in FIG. 5, movable screen 28 is disposed so as to reciprocate in a first direction and in a second direction on an optical path of the laser light beam from scanner 38. The first direction is a direction separating from scanner 38 (a direction indicated by arrow X in FIG. 5), and the second direction is a direction approaching scanner 38 (a direction indicated by arrow Y in FIG. 5). Further, movable screen 28 reciprocates in a posture inclined to moving directions (first and second directions) of movable screen 28.

When movable screen 28 moves in the first direction, the laser light beam from scanner 38 raster-scans movable screen 28, thereby forming first image 40 (refer to FIG. 7 described later) in movable screen 28. Meanwhile, when movable screen 28 moves in the second direction, the laser light beam from scanner 38 raster-scans movable screen 28, thereby forming second image 42 (refer to FIG. 7 described later) in movable screen 28. Note that methods of forming first image 40 and second image 42 will be described in detail later.

Driver 30 is configured with an actuator, for example. Driver 30 causes movable screen 28 to reciprocate (vibrate) in the first and second directions at a constant frequency (for example, 60 Hz) and with constant amplitude (for example, 1 mm), based on a drive signal from controller 34. Note that driver 30 causes movable screen 28 to reciprocate such that a period of time during which movable screen 28 moves in the first direction (or the second direction) is, for example, 25 msec or less, based on the drive signal from controller 34.

In this exemplary embodiment, projection unit 32 includes magnifying lens 44, first reflecting plate 46, and second reflecting plate 48, as an example of the optical system, and includes windshield 10 as an example of the display medium. The display medium may be a plate-shaped display medium having translucency.

Magnifying lens 44 is disposed on the optical path of the laser light beam transmitting through movable screen 28. Magnifying lens 44 magnifies first image 40 or second image 42 formed in movable screen 28.

First reflecting plate 46 and second reflecting plate 48 are disposed on the optical path of the laser light beam from magnifying lens 44, and reflect the laser light beam from magnifying lens 44 toward windshield 10. With this configuration, first reflecting plate 46 and second reflecting plate 48 project first image 40 or second image 42 magnified by magnifying lens 44 toward windshield 10.

Windshield 10 is disposed on the optical path of the laser light beam from second reflecting plate 48, and reflects the laser light beam from second reflecting plate 48 toward driver 12. With this configuration, when first image 40 is formed in movable screen 28, vertical image 18 that is the virtual image of first image 40 is displayed in space 16 in front of windshield 10. Meanwhile, when second image 42 is formed in movable screen 28, depth image 20 that is the virtual image of second image 42 is displayed in space 16 in front of windshield 10. It should be noted that movable screen 28 reciprocates at a relatively high speed, and therefore driver 12 views first image 40 and second image 42 as if the two images are displayed simultaneously.

Controller 34 has a function for outputting the drive signal to driver 30, a function for controlling a drive current supplied to light source 36, and a function for controlling a deflection angle of scanner 38. Controller 34 is configured with, for example, a central processing unit (CPU) or a processor, and reads and executes a computer program stored in a memory (not illustrated) to perform the above-described functions.

[1-3. Operation of Display Device]

Figure 6:
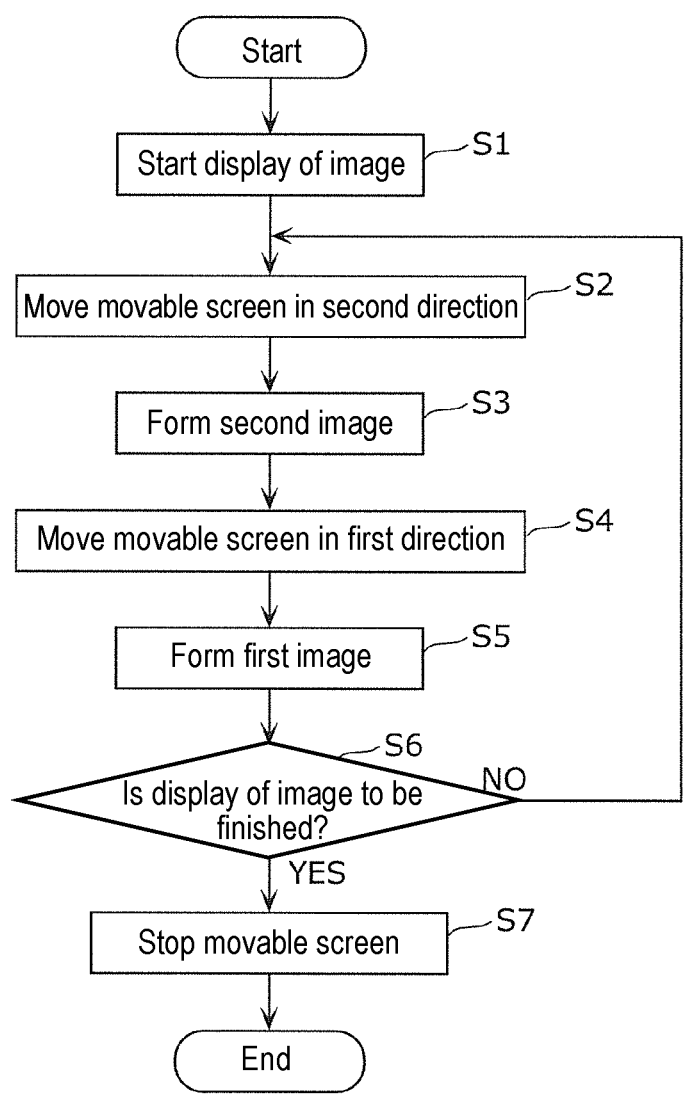
FIG. 6 is a flowchart illustrating a flow of operation of the display device according to the first exemplary embodiment.
Figure 7:
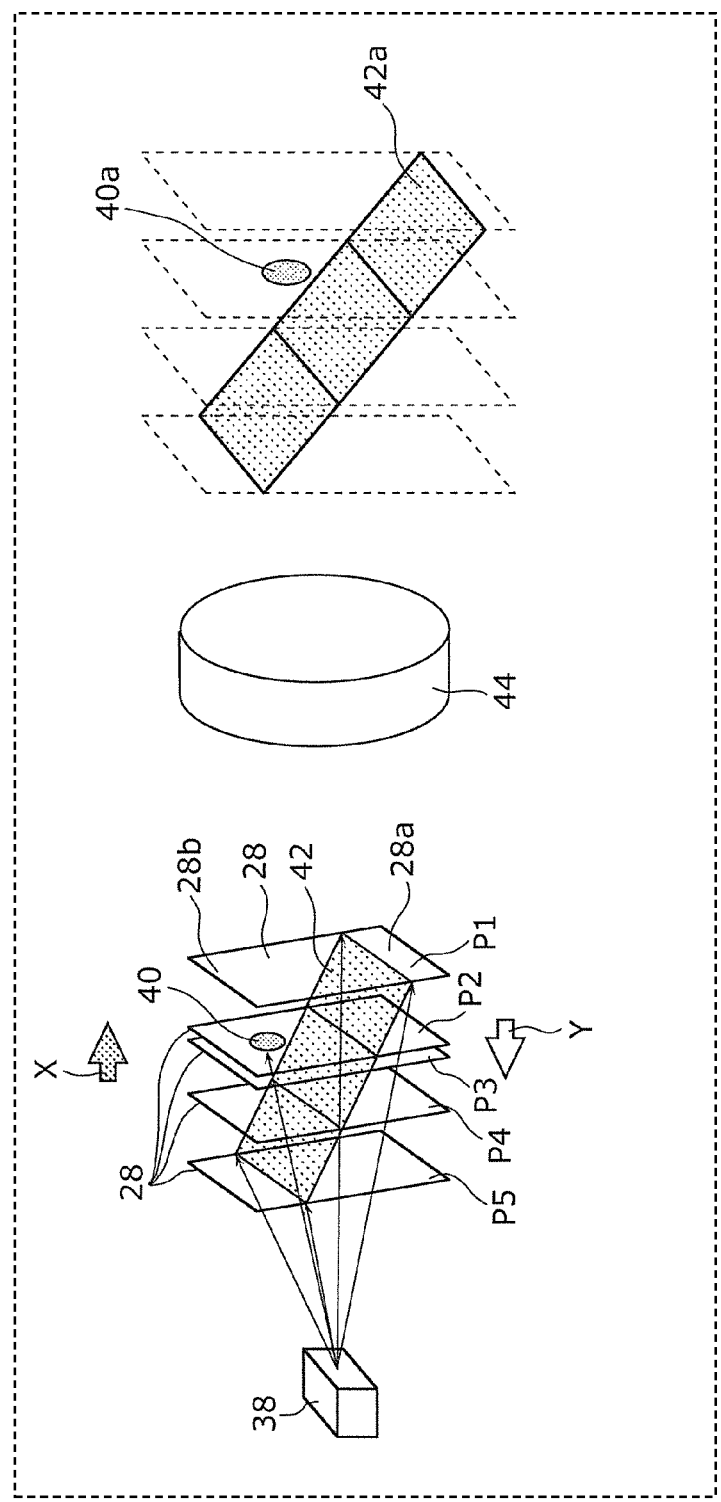
FIG. 7 is a view explaining a method of forming a first image and a second image performed by the display device according to the first exemplary embodiment.
Figure 8:
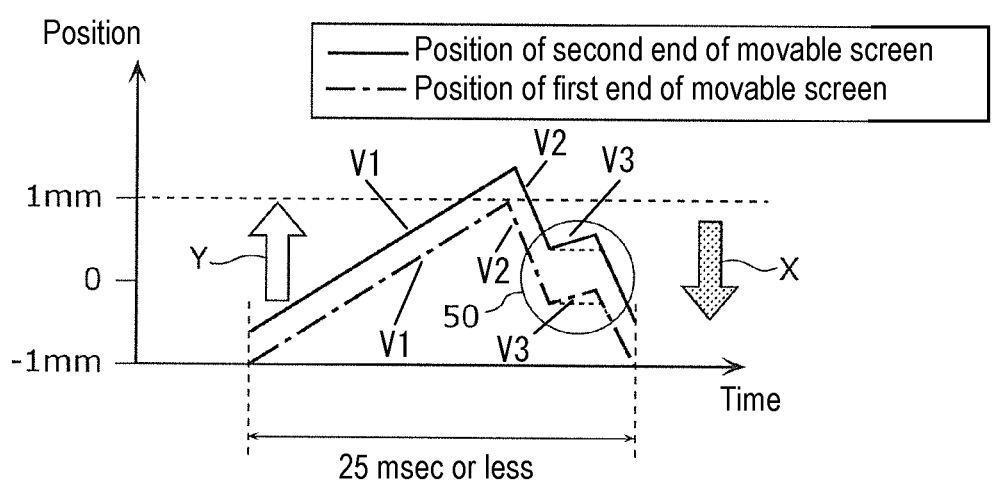
FIG. 8 is a graph illustrating a temporal change of positions of a first end and a second end of a movable screen in the display device according to the first exemplary embodiment.

Subsequently, operation of display device 2 according to the first exemplary embodiment will now be described herein with reference to FIGS. 5 to 8. FIG. 6 is a flowchart illustrating a flow of operation of display device 2 according to the first exemplary embodiment. FIG. 7 is a view explaining a method of forming first image 40 and second image 42 performed by display device 2 according to the first exemplary embodiment. FIG. 8 is a graph illustrating a temporal change of positions of first end 28a and second end 28b of movable screen 28 in display device 2 according to the first exemplary embodiment. An inclination of the graph in FIG. 8 denotes the moving speed of movable screen 28.

As illustrated in FIG. 6, display of image 8 is started (S1), and then movable screen 28 starts reciprocating in the first direction and the second direction. As illustrated in FIG. 7, when movable screen 28 moves from position P1 to position P5 in the second direction (a direction indicated by arrow Y in FIG. 7) (S2), the laser light beam from scanner 38 raster-scans movable screen 28 and transmits through movable screen 28. This forms second image 42 in movable screen 28 (S3). Specifically, as illustrated in FIG. 7, when movable screen 28 moves from position P1 to position P5 through position P2, position P3, and position P4, a position of the laser light beam transmitting through movable screen 28 moves from first end 28a toward second end 28b of movable screen 28. This causes a forming direction of second image 42 to be a direction inclined to the moving directions of movable screen 28. As illustrated in FIG. 8, during a period of time when movable screen 28 moves in the second direction, a moving speed of movable screen 28 is first speed V1, and is constant.

As illustrated in FIG. 7, second image 42 formed in movable screen 28 is magnified by magnifying lens 44, thereby forming second intermediate image 42a that is the virtual image of second image 42 on a light-emitting side of magnifying lens 44. Second intermediate image 42a described above is reflected by first reflecting plate 46 and second reflecting plate 48 to be projected on windshield 10. Therefore depth image 20 that is the virtual image of second image 42 is displayed in space 16 in front of windshield 10. At this time, a display direction of depth image 20 is a direction corresponding to the forming direction of second image 42, that is, the above-described depth direction.

Meanwhile, as illustrated in FIG. 7, when movable screen 28 moves from position P5 to position P1 in the first direction (a direction indicated by arrow X in FIG. 7) (S4), the laser light beam from scanner 38 raster-scans movable screen 28 and transmits through movable screen 28. This forms first image 40 in movable screen 28 (S5). Specifically, as illustrated in FIG. 7, during a period of time when movable screen 28 moves from position P3 to position P2, the position of the laser light beam transmitting through movable screen 28 moves in a direction from first end 28a toward second end 28b of movable screen 28. With this configuration, a forming direction of first image 40 is made perpendicular to the moving directions of movable screen 28, as indicated by arrow U in FIG. 5.

As illustrated in FIG. 8, at timing when the moving speed of movable screen 28 shifts from second speed V2 to third speed V3, first image 40 is formed in movable screen 28.

As illustrated in FIG. 7, first image 40 formed in movable screen 28 is magnified by magnifying lens 44, thereby forming first intermediate image 40a that is the virtual image of first image 40 on the light-emitting side of magnifying lens 44. First intermediate image 40a described above is reflected by first reflecting plate 46 and second reflecting plate 48 to be projected on windshield 10. Therefore vertical image 18 that is the virtual image of first image 40 is displayed in space 16 in front of windshield 10. At this time, a display direction of vertical image 18 is a direction corresponding to the forming direction of first image 40, that is, the above-described vertical direction.

When the display of image 8 is performed continuously (NO in S6), steps S2 to S5 described above are executed again. When the display of image 8 is to be finished (YES in S6), movable screen 28 stops reciprocating (S7).

Note that, as inclination angle θ (refer to FIG. 5) of movable screen 28 with respect to the display direction of first image 40 becomes larger, an inclination (V3) of a portion surrounded by frame line 50 in the graph in FIG. 8 becomes steeper.

[1-4. Effects]

Subsequently, effects obtained from display device 2 according to the first exemplary embodiment will now be described. As described above, movable screen 28 reciprocates in the posture inclined to the moving directions of movable screen 28. Therefore a change amount of the position of the laser light beam that scans movable screen 28 (that is, a difference between a maximum value of a graph indicated by a solid line and a minimum value of a graph indicated by a dashed line in FIG. 8) becomes lager than a moving distance in the second direction of movable screen 28 (that is, a difference between a maximum value and a minimum value of the graph indicated by the dashed line or the solid line in FIG. 8). As a result, a stroke amount when movable screen 28 reciprocates can be minimized, and therefore control for driving movable screen 28 can easily be performed (Second Exemplary Embodiment)

[2-1. Configuration of Display Device]

Figure 9:
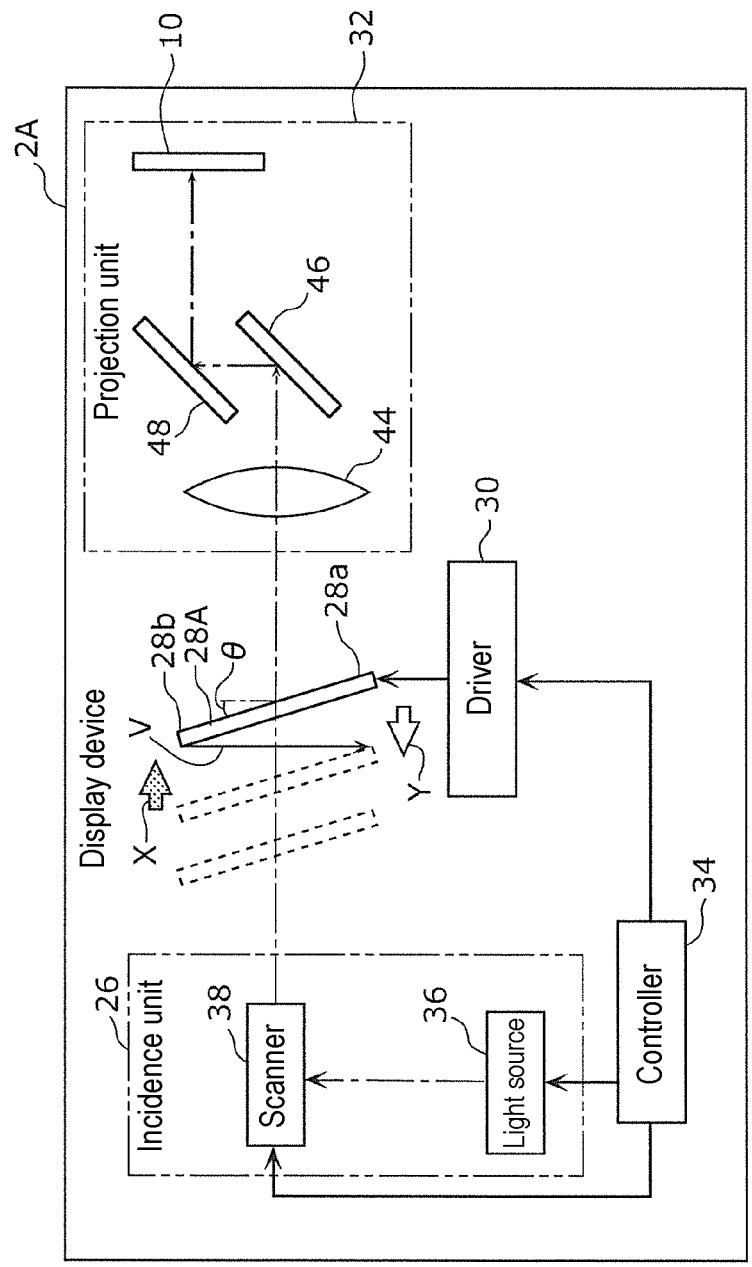
FIG. 9 is a block diagram illustrating a functional configuration of a display device according to a second exemplary embodiment.

Subsequently, a configuration of display device 2A according to a second exemplary embodiment will now be described herein with reference to FIG. 9. FIG. 9 is a block diagram illustrating a functional configuration of display device 2A according to the second exemplary embodiment. In the second exemplary embodiment, components identical to components of the first exemplary embodiment are denoted by the same numerals or symbols, and detailed descriptions thereof are omitted.

As illustrated in FIG. 9, display device 2A according to the second exemplary embodiment is different from display device 2 according to the first exemplary embodiment in that moving directions of movable screen 28A when first image 40 (refer to FIG. 7) and second image 42 (refer to FIG. 7) are formed are different from those in the first exemplary embodiment, respectively. In other word, the laser light beam that is emitted from scanner 38 and raster-scans movable screen 28A when movable screen 28A moves in the second direction forms first image 40 in movable screen 28A. Meanwhile, the laser light beam that is emitted from scanner 38 and raster-scans movable screen 28A when movable screen 28A moves in the first direction forms second image 42 in movable screen 28A.

Further, scanner 38 causes the laser light beam to raster-scan in a direction from second end 28b to first end 28a of movable screen 28A.

[2-2. Operation of Display Device]

Figure 10:
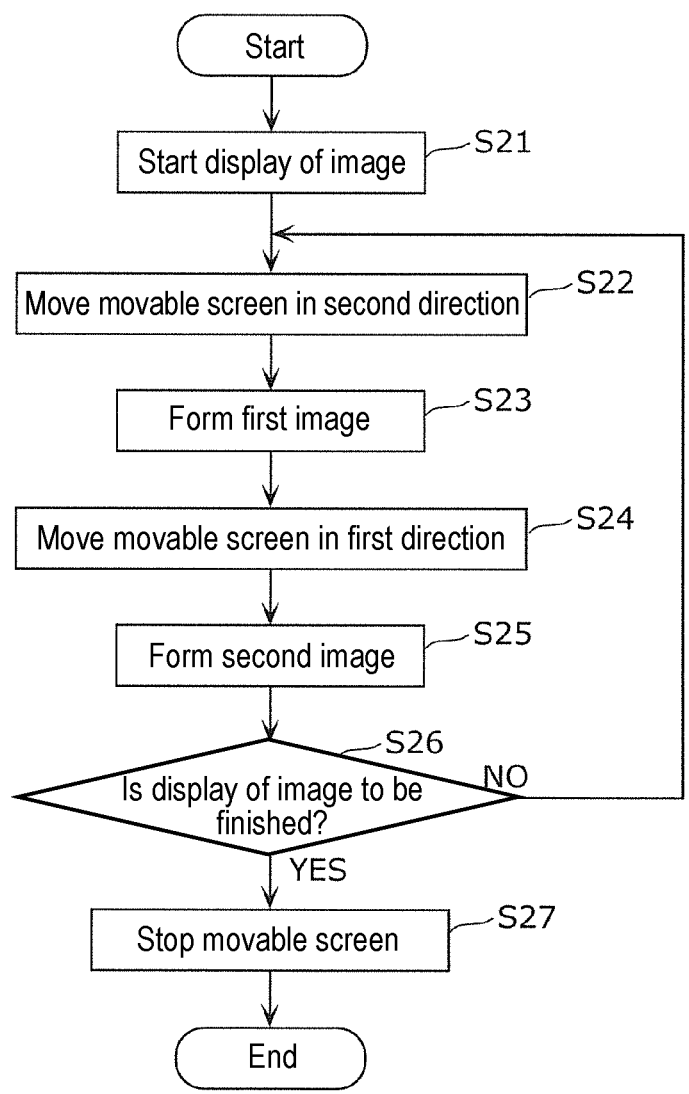
FIG. 10 is a flowchart illustrating a flow of operation of the display device according to the second exemplary embodiment.
Figure 11:
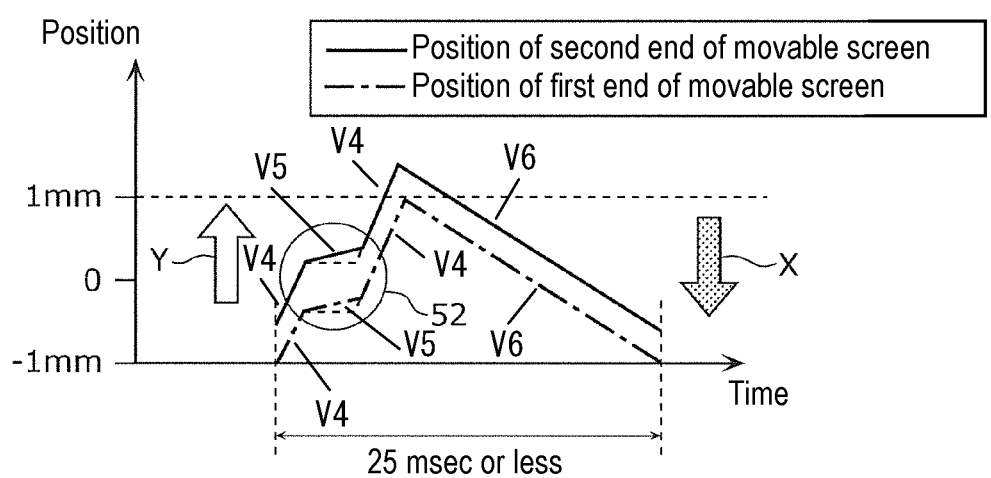
FIG. 11 is a graph illustrating a temporal change of positions of a first end and a second end of a movable screen in the display device according to the second exemplary embodiment.

Subsequently, operation of display device 2A according to the second exemplary embodiment will now be described herein with reference to FIGS. 9 to 11. FIG. 10 is a flowchart illustrating a flow of operation of display device 2A according to the second exemplary embodiment. FIG. 11 is a graph illustrating a temporal change of positions of first end 28a and second end 28b of movable screen 28A in display device 2A according to the second exemplary embodiment. An inclination of the graph in FIG. 11 denotes a moving speed of movable screen 28A.

As illustrated in FIG. 10, display of image 8 is started (S21), and then movable screen 28A starts reciprocating in the second direction and the first direction. When movable screen 28A moves in the second direction (a direction indicated by arrow Y in FIG. 9) (S22), the laser light beam from scanner 38 raster-scans movable screen 28A and transmits through movable screen 28A, thereby forming first image 40 in movable screen 28A (S23). A forming direction of first image 40 is made perpendicular to the moving directions of movable screen 28A, as indicated by arrow V in FIG. 9.

As illustrated in FIG. 11, when movable screen 28A moves in the second direction, a moving speed of movable screen 28A decreases from fourth speed V4 to fifth speed V5, and then increases from fifth speed V5 to fourth speed V4 again. In other words, during a period of time when movable screen 28A moves in the second direction, movable screen 28A continuously moves without stoppage. At timing when the moving speed of movable screen 28A reaches fifth speed V5, first image 40 is formed in movable screen 28A. Note that, as inclination angle θ (refer to FIG. 9) of movable screen 28A with respect to the display direction of first image 40 becomes larger, an inclination (V5) of a portion surrounded by frame line 52 in the graph in FIG. 11 becomes steeper.

Meanwhile, when movable screen 28A moves in the first direction (a direction indicated by arrow X in FIG. 9) (S24), the laser light beam from scanner 38 raster-scans movable screen 28A and transmits through movable screen 28A. This forms second image 42 in movable screen 28A (S25). This causes a forming direction of second image 42 to be a direction inclined to the moving directions of movable screen 28A.

As illustrated in FIG. 11, when movable screen 28A moves in the first direction, the moving speed of movable screen 28A is sixth speed V6 (V5<V6<V4), and is constant. In other words, the moving speed (V5) of movable screen 28A when first image 40 is formed in movable screen 28A is smaller than the moving speed (V6) of movable screen 28A when second image 42 is formed in movable screen 28A.

When the display of image 8 is performed continuously (NO in S26), steps S22 to S25 described above are executed again. When the display of image 8 is to be finished (YES in S26), movable screen 28A stops reciprocating (S27).

[2-3. Effects]

Also in display device 2A according to the second exemplary embodiment, movable screen 28A reciprocates in a posture inclined to the moving directions of movable screen 28A. Therefore, when vertical image 18 is displayed, first image 40 is formed in movable screen 28A while movable screen 28A is caused to move in the second direction. This allows a forming direction of first image 40 to be perpendicular to the moving directions of movable screen 28A. As a result, at timing when first image 40 is formed in movable screen 28A, movable screen 28A is not needed to be urgently stopped temporarily (urgent acceleration and urgent deceleration), and therefore control for driving movable screen 28A can easily be performed.

(Modifications)

Although the display device according to one or more aspects has been described based on the exemplary embodiments, the present invention is not limited to the exemplary embodiments. Configurations in which various variations conceived by those skilled in the art are applied to the present exemplary embodiments, and configurations established by combining components in different exemplary embodiments or modifications may also fall within the scope of one or more aspects, without departing from the gist of the present invention.

For example, in the above-described exemplary embodiments, although a case where display device 2 (2A) is mounted on automobile 4 has been described, the present invention is not limited to the case. Display device 2 (2A) may be mounted on movable bodies such as motorcycles, airplanes, trains, or ships.

Furthermore, although a case where display device 2 (2A) is mounted on the vehicle has been described, the present invention is not limited to the case. Display device 2 (2A) may be mounted on, for example, glasses configured as wearable devices.

In the above-described exemplary embodiment, the constituent elements may be implemented in dedicated hardware or with execution of software programs individually suitable for those constituent elements. The constituent elements may be implemented by a program execution section, such as a CPU or a processor, reading and executing software programs stored in a recording medium, such as a hard disk or a semiconductor memory.

Furthermore cases such as the following (1) to (5) may be also involved in the present invention.

(1) Specifically, the above-described devices can be implemented using a computer system configured with a microprocessor, a read only memory (ROM), a read access memory (RAM), a hard disk unit, display unit, keyboard, mouse, and the like. A computer program is stored in the RAM or the hard disk unit. The microprocessor operates according to the computer program, and therefore the devices achieve the respective functions. Herein, the computer program is configured by combining a plurality of instruction codes that indicate instructions to a computer, in order to achieve predetermined functions.

(2) A part or all of the constituent elements configuring the above-described devices may be configured with a single-chip system large-scale-integration (LSI). The system LSI is a super multi-functional LSI manufactured such that a plurality of constituent units is integrated into a single chip, and specifically, is a computer system including the microprocessor, the ROM, the RAM, and the like. The ROM stores the computer program. The microprocessor loads the computer program from the ROM to the RAM, and performs operation such as computation according to the loaded computer program, and thus the system LSI achieves its functions.

(3) A part or all of the constituent elements configuring the above-described devices may be configured with an integrated circuit (IC) card detachable from each of the devices, or a single module. The IC card or the module is the computer system configured with the microprocessor, the ROM, the RAM, and the like. The IC card or the module may include the above-described super multi-functional LSI. The microprocessor operates according to the computer program, and thus the IC card or the module achieves its functions. The IC card or the module may have tamper resistance.

(4) The present invention may be implemented by using the above-described methods. Those methods may be implemented by using the computer program that is implemented by the computer, or may be implemented by using digital signals according to the computer program.

Furthermore, the present invention may be implemented by using a configuration that stores the computer program or the digital signals into a computer-readable recording medium such as a flexible disk, a hard disk, a compact disk (CD)-ROM, a magneto-optical disk (MO), a digital versatile disk (DVD), a DVD-ROM, a DVD-RAM, a Blu-ray (registered trademark) disk (BD), and a semiconductor memory. In addition, the present invention may be implemented by using the digital signals stored in those recording media.

The present invention may transmit the computer program or the digital signals via a network represented by a telecommunications line, a wireless or wired communication line, and the Internet, data broadcasting, and the like.

The present invention may be the computer system including the microprocessor and the memory. The memory may store the computer program, and the microprocessor may operate according to the computer program.

The program or the digital signals may be performed by another computer system that is independently provided, by being stored into a recording medium to be transported to the other computer, or by being transported to the other computer via networks and the like.

(5) The above-described exemplary embodiments and the above-described modifications may be combined.

INDUSTRIAL APPLICABILITY

A display device according to the present invention is applicable to a vehicular head-up display, for example.

REFERENCE MARKS IN THE DRAWINGS 2, 2A display device
4 automobile
6 dashboard
8 image
10 windshield
11 region
12 driver
14 scene
16 space
18 vertical direction
20 depth direction
22 pedestrian
24 road
26 incidence unit
28, 28A movable screen
28a first end
28b second end
30 driver
32 projection unit
34 controller
36 light source
38 scanner
40 first image
40a first intermediate image
42 second image
42a second intermediate image
44 magnifying lens
46 first reflecting plate
48 second reflecting plate
50, 52 frame line

The invention claimed is:

1. A display device comprising: a light source configured to emit a light beam; a scanner configured to cause the light beam from the light source to scan; a movable screen in which an image is formed by transmitting the light beam from the scanner; an optical system configured to project the image formed in the movable screen on a display medium; and a driver configured to cause the movable screen to reciprocate in a first direction separating from the scanner and in a second direction approaching the scanner, wherein the image projected on the display medium is displayed as a virtual image of the image in a space in front of the display medium, and the movable screen reciprocates in a posture inclined to moving directions of the movable screen; wherein the scanner forms a first image in the movable screen while the movable screen moves in one of the first direction and the second direction, the scanner further forms a second image in the movable screen while the movable screen moves in another of the first direction and the second direction, and a moving speed of the movable screen when the first image is formed in the movable screen is smaller than a moving speed of the movable screen when the second image is formed in the movable screen.

2. The display device according to claim 1, wherein the scanner forms the first image in the movable screen while the movable screen moves in one of the first direction and the second direction, and the optical system displays a vertical image that is a virtual image of the first image formed in the movable screen, in a vertical direction in the space.

3. The display device according to claim 1, wherein the scanner forms the second image in the movable screen while the movable screen moves in one of the first direction and the second direction, and the optical system further displays a depth image that is a virtual image of the second image formed in the movable screen, in a depth direction that is a direction intersecting a vertical direction in the space.

4. The display device according to claim 1, wherein the display medium is a vehicular windshield, and the space is a space in front of the vehicular windshield.

5. A movable body comprising: a body; a driver that drives the body; and the display device according to claim 1, the display device being mounted on the body.

* * * * *